US010155336B2

(12) United States Patent
Standaert

(10) Patent No.: US 10,155,336 B2
(45) Date of Patent: Dec. 18, 2018

(54) HOLDER FOR A FLUID PRODUCT AND METHOD FOR PRODUCING SUCH A HOLDER

(71) Applicant: CARDIFF GROUP, NAAMLOZE VENNOOTSCHAP, Zonhoven (BE)

(72) Inventor: Geert Norbert R. Standaert, Zonhoven (BE)

(73) Assignee: CARDIFF GROUP, NAAMLOZE VENNOOTSCHAP, Zonhoven (BE)

( * ) Notice: Subject to any disclaimer, the term of this patent is extended or adjusted under 35 U.S.C. 154(b) by 429 days.

(21) Appl. No.: 14/758,361

(22) PCT Filed: Jan. 13, 2014

(86) PCT No.: PCT/BE2014/000003
§ 371 (c)(1),
(2) Date: Jun. 29, 2015

(87) PCT Pub. No.: WO2014/110633
PCT Pub. Date: Jul. 24, 2014

(65) Prior Publication Data
US 2015/0360410 A1    Dec. 17, 2015

(30) Foreign Application Priority Data

Jan. 15, 2013    (BE) .................................. 2013/0026

(51) Int. Cl.
*B65D 1/40*    (2006.01)
*B29C 49/42*    (2006.01)
(Continued)

(52) U.S. Cl.
CPC .......... *B29C 49/4268* (2013.01); *B29C 49/48* (2013.01); *B29C 49/482* (2013.01);
(Continued)

(58) Field of Classification Search
CPC ............... B65D 1/16; B65D 1/42; B65D 1/40
(Continued)

(56) References Cited

U.S. PATENT DOCUMENTS

| 4,925,049 | A | * | 5/1990 | Przytulla | .................. | B65D 1/16 220/675 |
| 5,593,060 | A | * | 1/1997 | Przytulla | .................. | B65D 1/16 206/508 |
| 7,655,177 | B2 | * | 2/2010 | Schutz | .................... | B29C 49/20 264/163 |

FOREIGN PATENT DOCUMENTS

| DE | 11 30 151 B | 5/1962 |
| DE | 10 2005 001649 A1 | 9/2005 |

(Continued)

OTHER PUBLICATIONS

International Search Report, dated Apr. 28, 2014, from corresponding PCT application.

*Primary Examiner* — Jeffrey Allen
(74) *Attorney, Agent, or Firm* — Young & Thompson

(57) ABSTRACT

Method for forming a holder (1), by blow moulding, with a wall (3), whereby a preform is pushed against a first and second mould part (10, 11) to form an intermediate form, in which the second mould part (11) is moved and takes the intermediate form with it in order to form an edge (5) between the first and second mould part (10, 11), whereby the mould parts (10, 11) are such that the edge (5) includes a first and second edge part (13, 14)), of which the second (14) is closer to the wall (3) than the first, of which the first (13) makes an angle ($\alpha$) to the direction of movement of the second mould part (11) and of which the second (14) makes a larger angle ($\beta$) to it.

10 Claims, 6 Drawing Sheets

(51) Int. Cl.
  *B29C 49/48* (2006.01)
  *B65D 1/16* (2006.01)
  *B65D 25/28* (2006.01)
  *B65D 81/20* (2006.01)
  *B65D 85/00* (2006.01)
  *B29L 31/00* (2006.01)
  *B29K 23/00* (2006.01)
  *B29C 49/04* (2006.01)
  *B29C 49/54* (2006.01)
  *B29K 105/00* (2006.01)
  *B29L 22/00* (2006.01)

(52) U.S. Cl.
  CPC ............... *B65D 1/16* (2013.01); *B65D 1/40* (2013.01); *B65D 25/2888* (2013.01); *B65D 81/2053* (2013.01); *B65D 85/70* (2013.01); *B29C 49/04* (2013.01); *B29C 49/541* (2013.01); *B29C 2049/4805* (2013.01); *B29C 2049/4828* (2013.01); *B29K 2023/12* (2013.01); *B29K 2105/253* (2013.01); *B29L 2022/00* (2013.01); *B29L 2031/7154* (2013.01); *B29L 2031/7156* (2013.01)

(58) Field of Classification Search
  USPC .......................................................... 206/812
  See application file for complete search history.

(56) References Cited

FOREIGN PATENT DOCUMENTS

| | | |
|---|---|---|
| EP | 0 704 379 A2 | 4/1996 |
| EP | 0 936 149 A1 | 8/1999 |
| JP | S57 131525 A | 8/1982 |

* cited by examiner

HOLDER FOR A FLUID PRODUCT AND METHOD FOR PRODUCING SUCH A HOLDER

BACKGROUND OF THE INVENTION

Field of the Invention

The present invention relates to a holder for a fluid product and method for producing such a holder.

More specifically, the invention relates to a holder that is produced by blow moulding and which has an upright edge with respect to the wall of the holder, for example to act as a base for the holder.

Description of the Related Art

Such a holder can be intended for a large number of different products. In particular, it concerns a beer keg here.

Such a holder can be made in a known way by blow moulding. A preform is hereby made by extrusion, for example. This is a shell of thermoplastic material, for example polyethylene, closed at one end that is at a temperature at which the material is plastic.

This preform is blown against a cooled mould by means of compressed air, whereby an intermediate form occurs, that approximately has the shape and size of the final holder, but is not yet provided with a number of details.

Practically immediately thereafter, if the material is still plastic, a part of the mould, at the location of the position that will become the underside of the holder, is moved with respect to another part of the mould.

As a result the material of the intermediate form is pushed inwards, such that this part of the intermediate form deforms into the final desired shape of the holder.

The parts of the mould are hereby of such a shape that in the end position of the two parts there is a space between the two parts, in which space the edge is formed.

Such producing is generally done in an upside-down orientation, i.e. the underside of the final holder is formed from the top of the preform and intermediate form, at the top of the device in which the holder is produced.

Such traditional producing methods and/or the products thereof are described in for instance DE 1130151 B1, EP 704379 A2, DE 10 2005 001649 A1 and EP 0936149 A1. schobel When moving the parts of the mould with respect to one another, a significant quantity of material of the wall of the intermediate form is pushed inwards. This material accumulates as a ring-shaped thickening, with an approximately teardrop-shaped cross-section, on the inside of the wall close to the transition between the edge and the wall.

Hereby a constriction can also arise just next to this thickening.

A disadvantage of the holders formed in this way is that a weak spot occurs at the location of the transition between the edge and the wall of the holder, such that tears can occur in the holder during subsequent use.

It is not entirely clear how this weak spot occurs, but the following factors could play a role:

There is a sharp transition between the thickening and the wall, which acts as a stress concentrator;

A constriction, if it occurs, is of course thinner and thus weaker;

As a result of the flow, the polymer chains of the thermoplastic material can take on a preferred direction locally that does not correspond to the direction in which the holder is loaded during use;

In the thickening the cooling of the thermoplastic material is much slower than in the wall, such that internal stresses can occur in the material;

Because the holders are produced upside down so to speak, gravity is largely in the same direction as the flow direction of the thermoplastic material, such that the effects mentioned above occur to a greater extent.

BRIEF SUMMARY OF THE INVENTION

The purpose of the present invention is to provide a solution to the aforementioned and other disadvantages by providing a method for forming a holder for a fluid product by means of blow moulding, whereby the holder comprises a wall and an edge, formed integrally with the wall, protruding outside the wall, whereby a thermoplastic preform is pushed outwards under gas pressure against a first mould part and a second mould part to form a thermoplastic intermediate form, in which the second mould part is then moved inwards such that a part of the intermediate form is pushed inwards by the second mould part in order to form the edge in the space between the first and second mould part, whereby the first mould part and the second mould part are of such a shape that the edge formed comprises a first edge part and a second edge part, whereby the second edge part is closer to the wall than the first edge part and the first edge part makes a first angle to the direction in which the second mould part is moved and the second edge part makes a larger angle to this direction, whereby the first angle is greater than 10°.

Preferably the first mould part and the second mould part are hereby of such a shape that the first edge part and the second edge part fit together and/or that the first edge part and the second edge part are straight in a vertical cross-section, i.e. a cross-section parallel to the direction in which the second mould part is moved, and/or that the first edge part is at the free end of the edge.

In this way a weakening of the wall at the location where the edge is affixed is at least partially prevented.

In the last phase of the movement, the thermoplastic material that is pushed out of the space between the two mould parts during the method is forced in a more horizontal direction than with the known technologies due to the shape of the mould, such that this material is spread over a larger part of the wall.

In preferred variants one or more of the following measures are applied to obtain the above-mentioned effect to a greater extent:

The first mould part and the second mould part are of such a shape that the second edge part makes an angle to the direction of movement of the second mould part that is greater than 80°.

The first mould part and the second mould part are of such a shape that the second edge part directly connects to the wall or connects to the wall via a third edge part that is shorter than the second edge part.

The first mould part and the second mould part are of such a shape that the distance between the location where the edge connects to the wall and the free end of the edge, measured over the central line of the cross-section of the edge, is a least 20 mm and a maximum of 70 mm, and preferably between 28 mm and 60 mm.

The first mould part and the second mould part are of such a shape that the second edge part extends over at least 12% and a maximum of 35%, and preferably between 15% and 28% of the above distance.

The first mould part and the second mould part are of such a shape that the first edge part extends over at least 15% and a maximum of 85%, and preferably between 20% and 75% of the above-mentioned distance.

The first mould part and the second mould part are of such a shape that the first edge part makes an angle to the wall at the location where the edge connects to the wall of between 70° and 115°, and preferably between 80° and 105°.

The first mould part and the second mould part are of such shape that the second edge part makes an angle to the wall at the location where the edge connects to the wall of between 10° and 50°, preferably between 15° and 40°, and even more preferably between 20° and 30°.

In a preferred variant it concerns a method for forming such a holder with a wall that is a continuous wall at the location of the edge.

This means that the wall extends in opposite directions from the edge, so that the edge is not an edge that defines an opening in the holder.

In a further preferred variant the invention concerns a method for forming such a holder with a base for the holder, whereby the base is formed by the edge.

In a further preferred variant the invention concerns a method for forming such a holder for a fluid that is at an overpressure of 1 bar or more. This means that the holder must be resistant to an overpressure of 1 bar and preferably at least 5 bar.

In preferred variants the holder has a longitudinal axis, whereby the direction of movement of the second mould part coincides with the direction of the longitudinal axis.

The longitudinal axis is the axis where, perpendicular to it, the holder has the same cross-section over a certain distance. With most holders, such as barrels, seen in their position of use, this is the vertical central axis.

The invention also concerns a holder for a fluid product, whereby this holder comprises a wall to form a storage space for the product and an edge, formed integrally with the wall, protruding outside the wall, whereby the holder has a central longitudinal axis, whereby the edge comprises a first edge part and a second edge part, whereby the second edge part is closer to the wall than the first edge part and the first edge part makes a first angle to the longitudinal axis and the second edge part makes a larger angle to the longitudinal axis, whereby the first angle is greater than 10°.

The holder is hereby produced by means of blow moulding, making use of a mould with a least a first mould part and a second mould part, whereby during manufacture the second mould part moves such that the edge is formed in a space between the first and the second mould part.

Such a holder is stronger than a holder with an edge produced in a similar way without the edge parts concerned, such that it is more resistant to pressure and/or can be made with less material.

BRIEF DESCRIPTION OF THE DRAWINGS

With the intention of better showing the characteristics of the invention, a preferred embodiment of a holder according to the invention and a method according to the invention are described hereinafter by way of an example, without any limiting nature, with reference to the accompanying drawings, wherein.

DETAILED DESCRIPTION OF THE PREFERRED EMBODIMENTS

Figure 1:
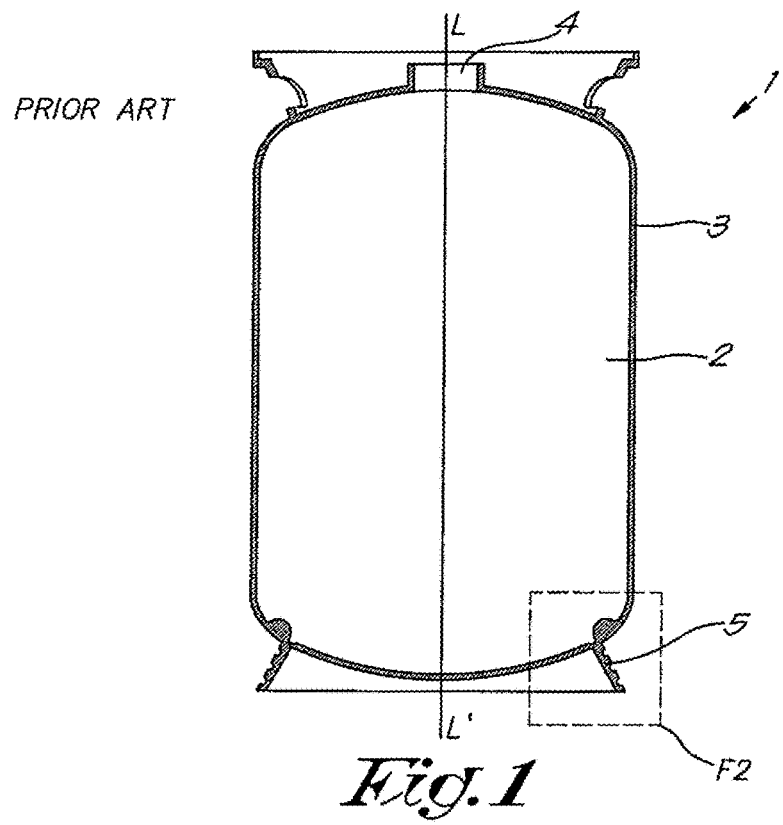
FIG. 1 shows a cross-section of a conventional holder for fluid.
Figure 2:
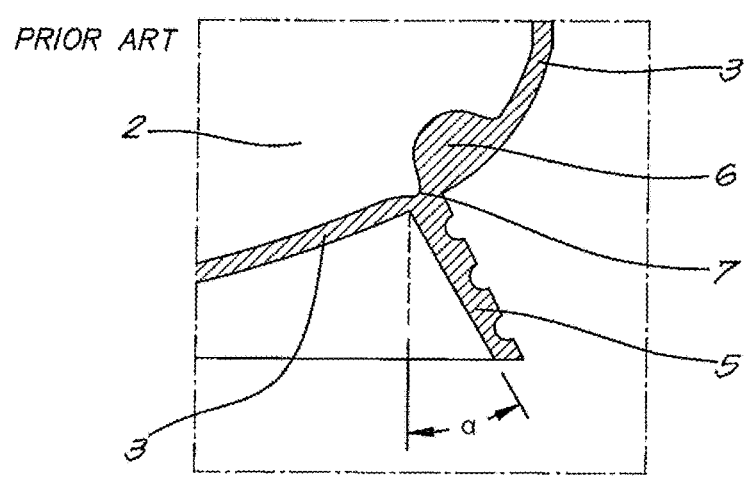
FIG. 2 shows the part of FIG. 1 indicated by F2 on a larger scale.

The holder 1 shown in FIGS. 1 and 2 is a keg for beer and is thus intended to be at an overpressure of approximately to 5 bar during use. The holder 1 has a vertical longitudinal axis L and has a round shape in the cross-section perpendicular to this longitudinal axis L.

The holder 1 comprises a storage space 2 for a fluid. This storage space 2 is formed and defined by the wall 3 of the holder. The storage space 2 is provided with a mouth 4 on the top, on which a tap installation can be connected.

The holder 1 is provided with a base to place the holder 1 stably on a support. This base is formed by an edge 5 that protrudes obliquely downwards from the wall 3, at the underside of the holder 1, at an angle of approximately 90° to the wall and an angle α of approximately 30° to the longitudinal axis.

The wall 3 and the edge 5 are made of polypropylene and are integrated, thus formed from one part.

An undesired consequence of the manufacture is that the holder 1 has a thickening 6 on the inside of the wall 3, close to the point where the edge 5 protrudes outside the wall 3. Next to this thickening 6 there is a constriction 7. The point of attachment of the edge 5 on the wall 3 turns out to be the weakest point of the holder 1 in practice.

Such a holder 1 is produced by blow moulding. This is done in an orientation and direction in which the holder 1 is produced with the mouth 4 downwards and thus the base upwards.

To this end, a polypropylene 8 shell is produced in a known way by means of an extruder that acts as a preform for the holder 1. This shell is at such a temperature that the polypropylene 8 is plastic. The formed shell is squeezed closed on its top so that it is only open on the underside.

Figure 3:
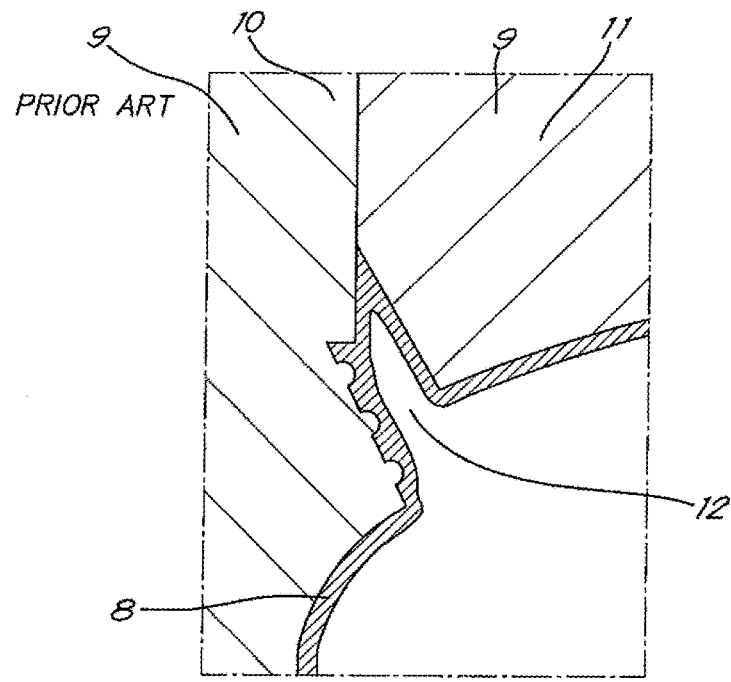
FIGS. 3 to 5 show successive states of the manufacture of the part of the holder of FIG. 1 shown in FIG. 2.

The shell is then placed in a mould 9 and its underside, with the part that will form the mouth 4, is pushed around a compressed air inlet pipe. Then as a result of the introduction of compressed air the shell is pushed against the mould 9, so that the polypropylene 8 takes on the shape of the mould. This situation is shown in FIG. 3. The plastic mass of polypropylene 8 hereby forms an intermediate form for the manufacture of the holder 1.

This is the case because the mould 9 comprises a first mould part 10 and a second mould part 11, whereby the second mould part 11 is movable with respect to the first mould part 10 and is not yet in the position in which the first mould part 10 and the second mould part 11 together define the desired shape of the holder 1.

Figure 4:
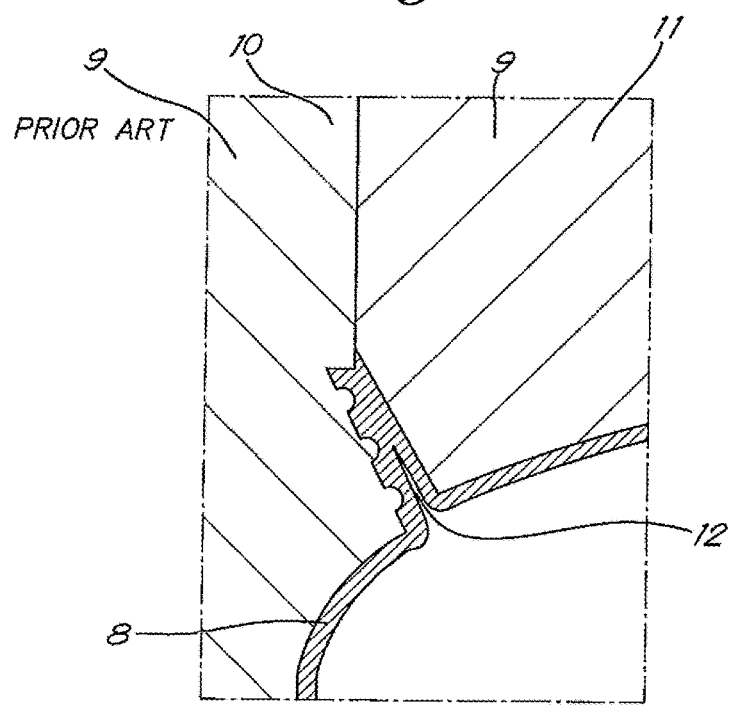
Figure 5:
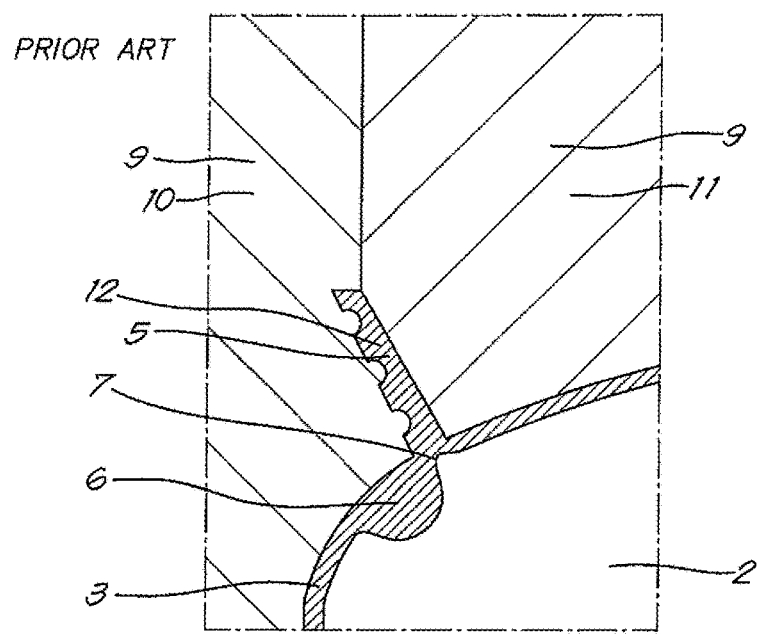

Simultaneously or immediately after the shell is placed under pressure, the second mould part 11 is pushed vertically downwards towards the inside, i.e. inwards to the mould cavity. Hereby the mould parts 10, 11 are formed such that in the end position of the second mould part 11, i.e. at the end of its movement, the desired shape of the holder 1 is obtained by the combined mould parts 10, 11. The position of the mould parts 11 and the polypropylene 8 in this end position is shown in FIG. 5, whereby FIG. 4 shows an intermediate position.

Hereby, in the said end position, a space 12 is provided between the first mould part 10 and the second mould part that corresponds to the desired shape of the base. During the movement of the second mould part 11, this space 12 becomes increasingly small as shown in the sequence of FIGS. 3,4 and 5, so that a part of the polypropylene 8 in this space 12 is squeezed out of it and forms the thickening 6 on the inside of the wall 3.

Due to the flow characteristics of the polypropylene 8, combined with gravity, the constriction 7 is also formed.

The mould 9 is cooled, so that through contact between the mould 9 and the polypropylene 8, this last-mentioned cools and solidifies.

The said first mould part 10 and second mould part 11 normally each consist of a number of sub-parts, which can be left undiscussed for the purpose of the present invention. For example, as is well known in the art, the first mould part 10 is made to open sideways in at least two sub-parts, firstly to push the polypropylene 8 around the inlet pipe so that it fits well, and also to be able to take the holder 1 out of the mould 9 after manufacture.

Figure 6:
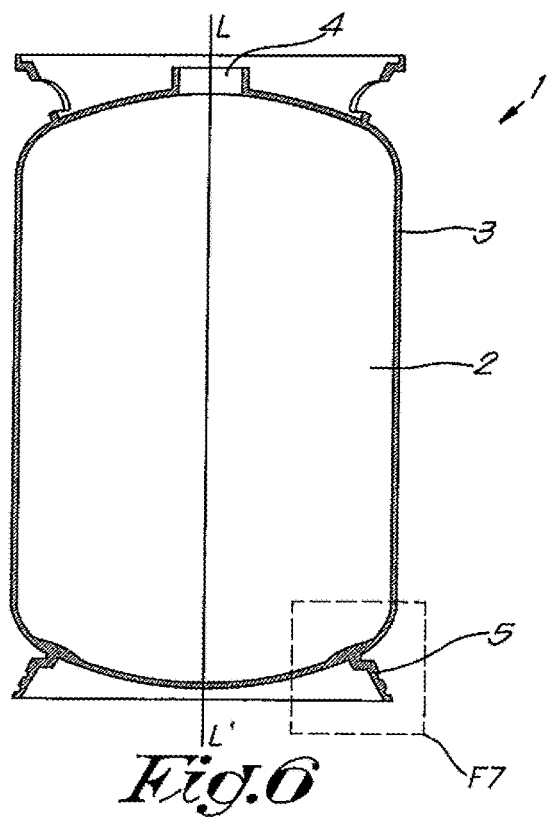
FIG. 6 shows a cross-section of a holder for fluid according to the invention.
Figure 7:
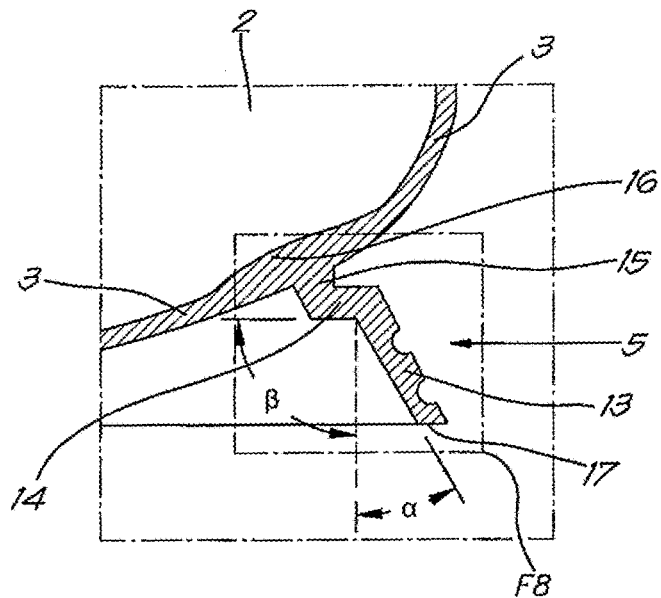
FIG. 7 shows the part of FIG. 6 indicated by F7 on a larger scale.

The holder 1 according to the invention, as shown in FIGS. 6 and 7, differs from the holder 1 described above in the following way.

In this case the protruding edge 5 that forms the base consists of three straight edge parts, i.e. from top to bottom a first edge part 13, a second edge part 14, and a third edge part 15.

The first edge part 13 runs obliquely downwards away from the wall of the holder 1, at an angle of approximately 90° to it, and at an angle α of approximately 30° to the longitudinal axis L. The second edge part 14 runs horizontally, thus at an angle β to the longitudinal axis L that is greater than the first-mentioned angle α, and more specifically is 90° in this example.

The third edge part 15 is a very short edge part, with a non-constant thickness so that a distinct angle to the longitudinal axis L cannot be defined, nor is it important. This third edge part 15 can also be considered as a transitional part between the second edge part 14 and the wall 3.

In this holder 1 according to the invention, there is also a thickening 16 of the wall 3 on the inside of the wall 3 at the location of the attachment of the edge 5. However, this thickening 16 is not as thick and is more spread out, compared to the thickenings 6 in the known holders 1. This thickening 16 is not accompanied by a constriction either.

Figure 8:
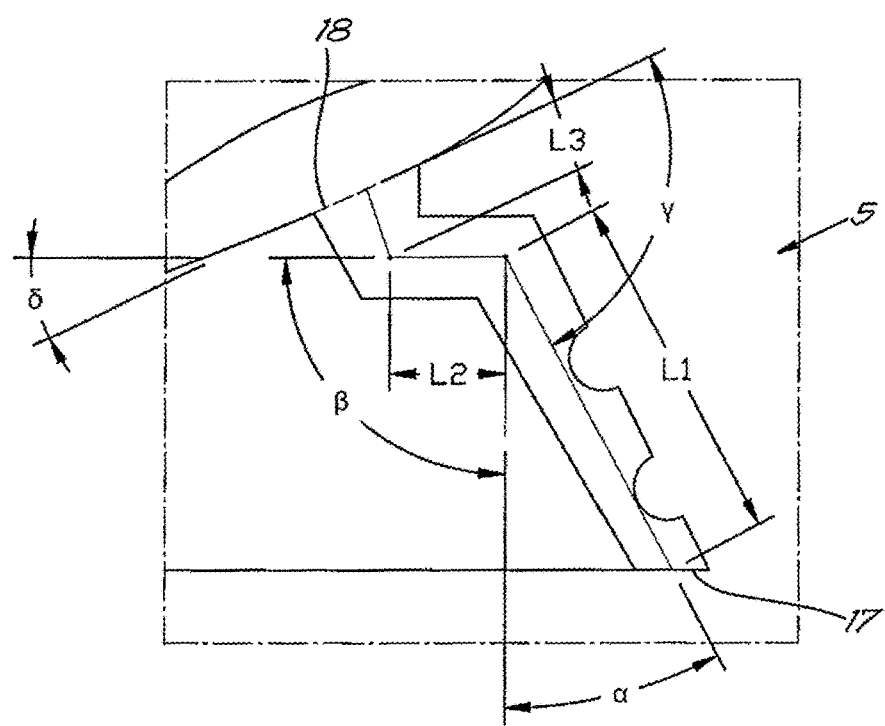
FIG. 8 shows the part of FIG. 7 indicated by F8 on a larger scale and without shading.

The length L1 of the first edge part 13 is 35 mm, measured over the centre of this first edge part from the free end 17 of the edge 5, as shown in FIG. 8.

The length L2 of the second edge part 14 is 11 mm, also measured over the centre of this second edge part 14, also shown in FIG. 8.

The length L3 of the third edge part 15 is 5 mm, measured from the connection with the second edge part 14 to the projection 18 of the wall 3 at the location of the edge 5.

This means that the distance L1+L2+L3 over which the edge 5 extends, from the location where the edge 5 connects to the wall 3 and the free end 17 of the edge 5, is 51 mm.

The first edge part 13 makes an angle γ of 86° to the wall 3 at the location where the edge 5 connects to the wall 3.

The second edge part 14 makes an angle δ of 24° to the wall 3 at the location where the edge 5 connects to the wall 3.

The holder 1 shown in FIGS. 6 and 7 has no appreciable weakening at the place of attachment of the edge 5 to the wall 3.

Figure 9:
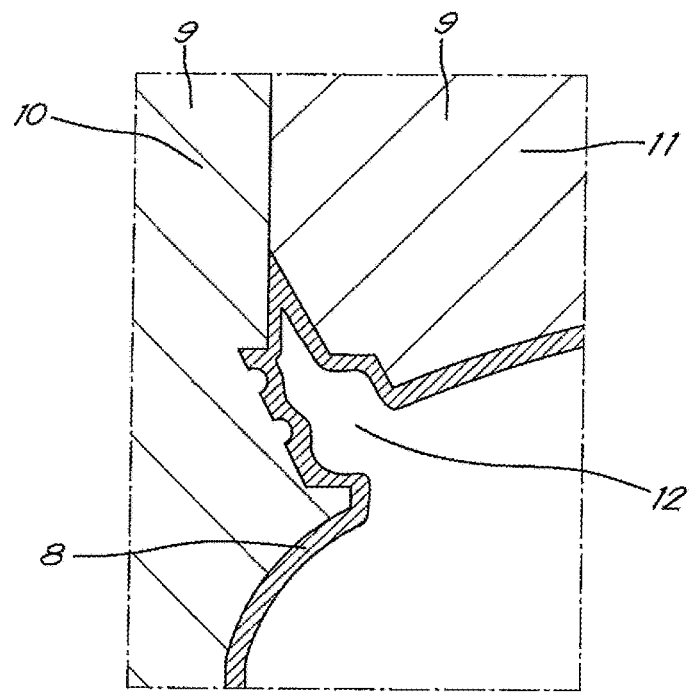
FIGS. 9 to 11 show successive states of the manufacture of the part of the holder of FIG. 6 shown in FIG. 7.
Figure 10:
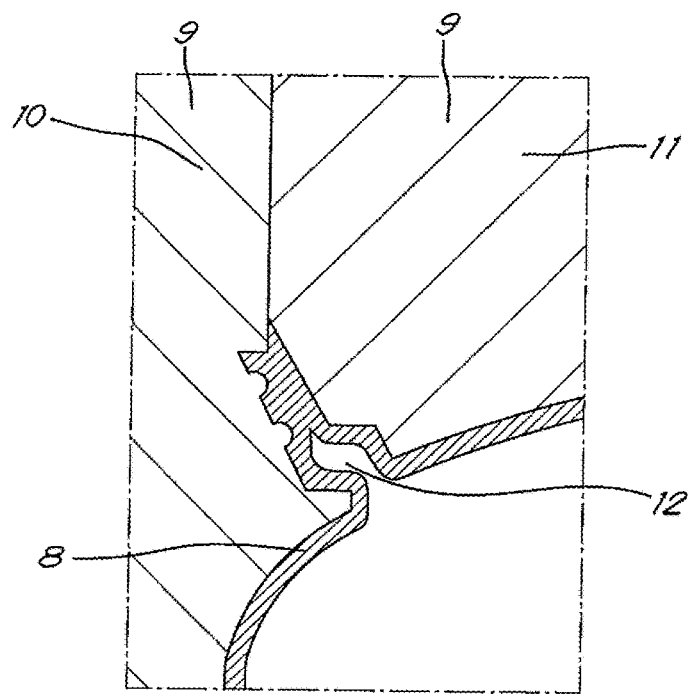
Figure 11:
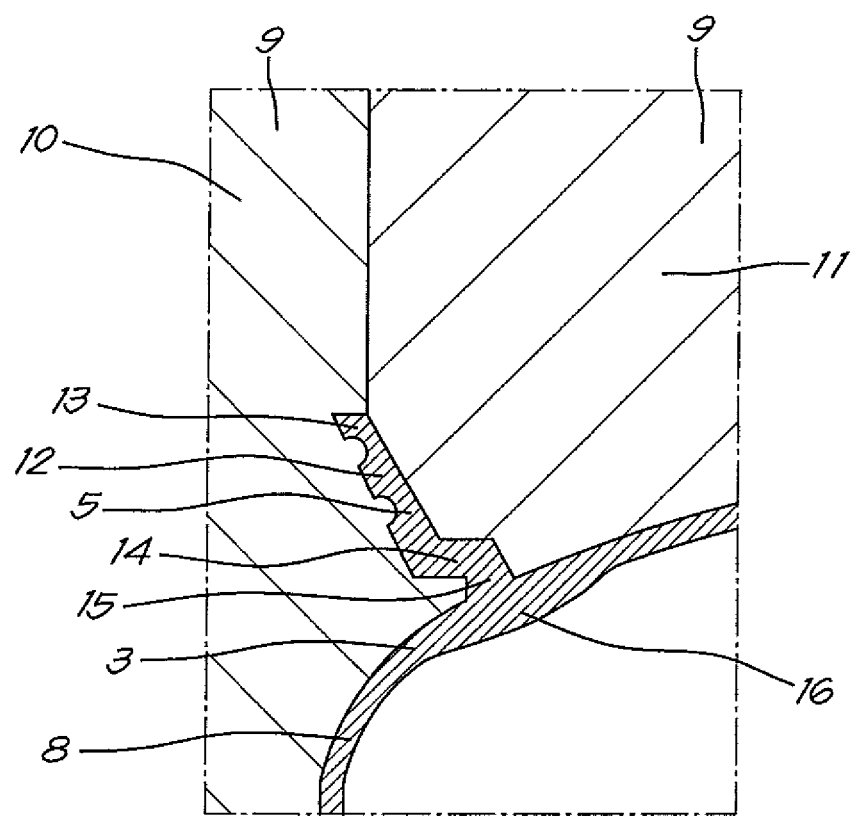

The producing method of a holder 1 according to the invention, as shown in FIGS. 8 to 10, only differs from the method described above by the mould parts 10, 11 having a different shape, corresponding to the desired shape of the holder 1.

This shows that due to the changed flow direction and flow velocity of the polypropylene 8 that is pushed out of the space between the first mould part 10 and the second mould part 11, combined with gravity, the excessive thickening 6 and constriction 7 of the known method do not occur, but that this polypropylene 8 spreads out relatively evenly.

The present invention is by no means limited to the embodiment described as an example and shown in the drawings, but such a method and holder can be realised according to different variants without departing from the scope of the invention.

The invention claimed is:

1. A holder for a fluid product, the holder comprising:
a wall configured to form a storage space for the product; and
an edge, formed integrally with the wall, protruding outside the wall, the edge consisting of three straight edge parts, from top to bottom,
a first edge part having a first edge length L1,
a second edge part having a second edge length L2, and
a third edge part having a third edge length L3,
the edge extending over a distance D=L1+L2+L3,
the second edge part being closer to the wall than the first edge part, the first edge part making a first angle α to a central longitudinal axis of the holder, the second edge part making a larger angle β to the longitudinal axis than the first angle α to the longitudinal axis, the first edge part making the first angle α to the longitudinal axis greater than 10°, the first edge part and the second edge part connecting, the first edge part and the second edge part being straight in a vertical cross-section,
the second edge part connecting to the wall via the third edge part that is shorter than the second edge part,
wherein the holder is manufactured by blow molding, making use of a mold with at least a first mold part and a second mold part, the second mold part moving during manufacture such that the edge is formed in a space between the first mold part and the second mold part.

2. The holder according to claim 1, wherein the first edge part is at a free end of the edge.

3. The holder according to claim 2, wherein the distance between the location at which the edge connects to the wall and the free end of the edge is at least 20 mm and a maximum of 70 mm.

4. The holder according to claim 2, wherein the second edge part extends over at least 12% and a maximum of 35% of the distance between the location at which the edge connects to the wall and the free end of the edge.

5. The holder according to claim 2, wherein the first edge part extends over at least 15% and a maximum of 85% of the distance between the location at which the edge connects to the wall and the free end of the edge.

6. The holder according to claim 1, wherein the first edge part makes an angle Y of between 70° and 115° to the wall at the location at which the edge connects to the wall.

7. The holder according to claim 1, wherein the second edge part makes an angle δ of between 10° and 50° to the wall at the location at which the edge connects to the wall.

8. The holder according to claim 1, wherein the wall extends on both sides of the edge.

9. The holder according to claim 1, wherein the second edge part makes the larger angle β of greater than 80° to the longitudinal axis.

10. The holder according to claim 1, wherein the holder is configured to hold a fluid that is at an overpressure of 1 bar or more.

* * * * *